(12) United States Patent
O'Brien, Jr.

(10) Patent No.: US 8,837,566 B1
(45) Date of Patent: Sep. 16, 2014

(54) SYSTEM AND METHOD FOR DETECTION OF NOISE IN SPARSE DATA SETS WITH EDGE-CORRECTED MEASUREMENTS

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 413 days.

(21) Appl. No.: 13/249,646

(22) Filed: Sep. 30, 2011

(51) Int. Cl.
*H04B 1/10* (2006.01)

(52) U.S. Cl.
USPC ........... 375/227; 375/326; 375/346; 375/351; 455/63; 455/222; 455/223; 455/296

(58) Field of Classification Search
USPC ........... 375/227, 326, 346, 351; 455/63, 67.3, 455/222, 223, 296
See application file for complete search history.

(56) References Cited

U.S. PATENT DOCUMENTS

| | | | |
|---|---|---|---|
| 5,966,414 A * | 10/1999 | O'Brien, Jr. | 375/346 |
| 6,397,234 B1 | 5/2002 | O'Brien, Jr. | |
| 6,466,516 B1 * | 10/2002 | O'Brien et al. | 367/131 |
| 6,597,634 B2 * | 7/2003 | O'Brien et al. | 367/135 |
| 6,967,899 B1 * | 11/2005 | O'Brien et al. | 367/131 |
| 6,980,926 B1 * | 12/2005 | O'Brien, Jr. | 702/179 |
| 6,983,222 B1 * | 1/2006 | O'Brien, Jr. | 702/181 |
| 7,269,538 B1 * | 9/2007 | O'Brien, Jr. | 703/2 |
| 7,277,573 B1 * | 10/2007 | O'Brien, Jr. | 382/154 |

* cited by examiner

*Primary Examiner* — Daniel Washburn
*Assistant Examiner* — Eboni Hughes
(74) *Attorney, Agent, or Firm* — James M. Kasischke; Michael P. Stanley (57) ABSTRACT

A signal processing system and method includes a transducer for receiving an analog signal having a random component and possibly an information component. The analog signal is converted into a digital signal having sample points. A nearest-neighbor calculation component calculates the expected average nearest neighbor distance between the sample points, the actual average distance and an error value. These values are corrected for edge effects. A first randomness assessment compares the actual average distance against the expected average distance with the standard error value. A second randomness assessment compares actual repeated values in the digital signal against expected repeated values. An information processing system continues processing the signal if the assessments indicate the possibility of an information component.

6 Claims, 7 Drawing Sheets

SYSTEM AND METHOD FOR DETECTION OF NOISE IN SPARSE DATA SETS WITH EDGE-CORRECTED MEASUREMENTS

STATEMENT OF GOVERNMENT INTEREST

The invention described herein may be manufactured and used by or for the Government of the United States of America for governmental purposes without the payment of royalties thereon or therefor.

CROSS REFERENCE TO OTHER PATENT APPLICATIONS

None.

BACKGROUND OF THE INVENTION (1) Field of the Invention

The invention relates generally to the field of systems and methods for performing digital signal processing operations in connection with real-world signals, and more particularly to systems and methods for characterizing signals to determine their stochastic properties, that is, to determine weather they are random. If the signals are random, they may be determined to constitute noise, in which case, additional signal processing efforts which might be undertaken to process the signals can be avoided.

In a number of applications, it is desirable to be able to determine the likelihood that a signal is random. For example, an acoustic signal, received in an ocean environment, may constitute noise alone, or it may include some useful "information" along with a background noise. If the signal constitutes noise alone, its amplitude will be random, but if it includes information, it will not be random and further processing may be useful to identify the information. In some signal processing systems, it is assumed that the signal includes information, and the signal is processed to try to extract this information. It may be the case that the noise level of a received signal is so great that the information cannot be extracted, but if the signal is pure noise, effort will be wasted in any event. It is accordingly desirable to be able to determine the likelihood that a signal constitutes only noise, or if it also includes information, so that a determination can be made as to whether processing of the signal to extract the information would be useful.

(2) Description of the Prior Art

U.S. Pat. No. 5,966,414 to Francis J. O'Brien, incorporated by reference herein, discloses a signal processing system that processes a digital signal generated in response to an analog signal, and which includes a noise component and possibly an information component. An information processing sub-system receives the digital signal and processes it to extract any information component. A noise likelihood determination sub-system receives the digital signal and generates a random noise assessment that the digital signal comprises solely random noise, and controls the operation of the information processing sub-system in response to the random noise assessment.

In U.S. Pat. No. 6,397,234 to Francis J. O'Brien, et al, incorporated by reference herein, there is described an improved apparatus for characterizing a spatial arrangement among data points of a time series distribution in a data processing system wherein a classification of the time series distribution is required. The apparatus includes a display/operating system adapted to accommodate a pre-selected number N of data points generated during a pre-selected time interval. A first comparator is used for determining the data points in the input time series distribution having the largest and the smallest values, and determining the difference $\Delta Y$ between the largest and smallest values of the data points. The apparatus further includes a virtual window creating device for creating a virtual window having an area equal to $N*\Delta Y$ containing the input time series distribution of data points, and sub-dividing substantially the entirety of the virtual window into a plurality k of cells, each cell having the same polygonal geometric shape and defining an equal area. A counter is used for determining the number m of the cells containing at least one of the input data points of the input time series distribution, and another calculator determines the expected number of cells which would be occupied by at least one of the data points in the event that the input time series distribution was random according to the relation $k*(1-e^{-N/k})$. A divider is provided for dividing m by $k*(1-e^{-N/k})$. A second comparator device compares the output of the divider with unity. The input time series distribution is characterized as random when the output of the divider is closest to 1, clustered when the output of the divider is less than the output closest to 1, and uniform when the output of the divider is greater than the output closest to 1. A marking device associates the output of the second comparator with the input time series distribution, and an output device for transferring the marked input time series distribution to the data processing system for further processing.

The signal processing system comprises a transducer means for receiving an analog signal. The analog signal includes a noise component and possibly also an information component. A digital signal is generated from the analog signal. A noise likelihood determination sub-system receives the digital signal and generates a random noise assessment. The noise likelihood determination sub-system includes randomness statistic generating means for generating a randomness statistic in response to an interpoint spacing parameter statistic. An information processing sub-system receives the digital signal and extracts the information component if the random noise assessment indicates that the digital signal does not comprise solely random noise. The noise likelihood determination sub-system generates the random noise assessment in response to the randomness statistic.

The signal processing method includes the steps of receiving an analog signal, including a noise component, and possibly also an information component, and generating in response a digital signal which is represented by a plurality of sample points distributed over a selected region. The signal processing method further indicates a noise likelihood determination step of generating, in response to the digital signal, a random noise assessment that the digital signal comprises solely random noise. The noise likelihood determination step includes the step of generating the random noise assessment in response to a nearest-neighbor distance deviation assessment generated in response to distances between nearest-neighbor sample points in comparison with distances between a like number of nearest-neighbor reference points that are randomly distributed. Thereafter, an information processing step of receiving and processing the digital signal is undertaken to extract the information component, if it has been determined during the noise likelihood determination step that the random noise assessment indicates that the digital signal does not comprise solely random noise.

The signal processing method includes characterizing a spatial arrangement among a pre-selected number N of data points of a time series distribution of pre-selected duration in a display/operating system wherein a classification of the spatial arrangement of the time series distribution is required.

The method comprises the steps of (i) inputting the time series distribution of no more than N data points, and no longer than the pre-selected time interval, into the display/operating system, (ii) determining the difference in value ΔY between a data point in the time series distribution having the greatest value and a data point in the time series distribution having the smallest value (iii) creating a virtual window having an area containing the time series distribution of data points, the area being equal to N*ΔY, (iv) subdividing substantially the entirety of the area of the window into a plurality k of cells, each cell having the same polygonal shape and defining the same area value, (v) determining a number m of the cells containing at least one of the data points of the time series distribution, (vi) determining an expected number M of cells containing at least one of the data points in the time series distribution in the event that the time series distribution is random in structure, and (vii) characterizing the input time series distribution as clustered in the event that m is less than M, random when m is equal to M, and uniform when m is greater then M.

A further consideration in accurate processing of signals relates to a condition known to statisticians as "edge-effect bias", which can introduce significant errors into calculations, leading to an incorrect conclusion regarding the presence of noise in a distribution.

Figure 1:
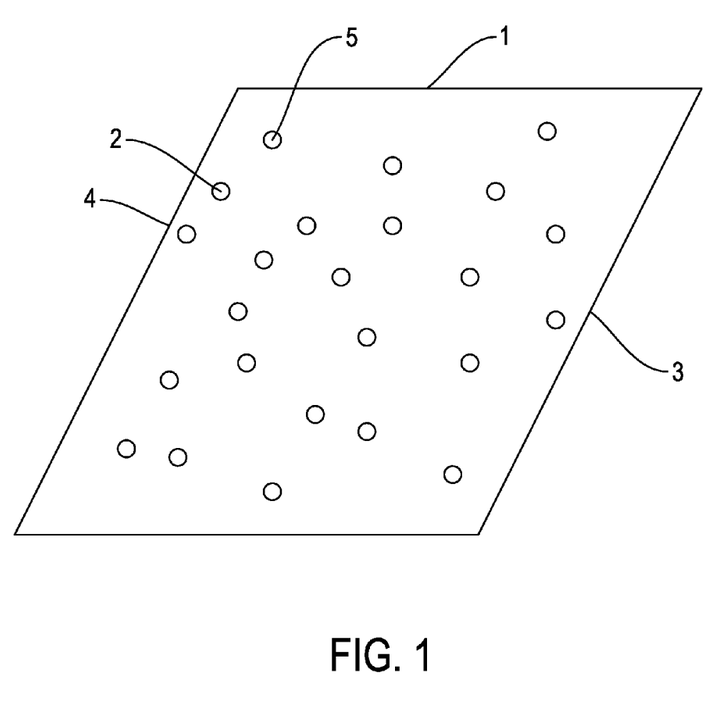
FIG. 1 is a diagrammatic illustration of spatial distribution of acoustic signals which include a "noise" component and possibly an information component.

Edge effects arise because the distribution of distances assumes an unbounded area, but the observed nearest-neighbor (nn) distances are calculated from points in a defined study area. FIG. 1 illustrates such a point 2 near the outer edge 3, or border, of a study area 1, it is possible that the true nearest-neighbor is a point 4, just outside the study information component. An information processing sub-system receives the digital signal and processes it to extract the information component. A noise likelihood determination sub-system receives the digital signal and generates a random noise assessment that the digital signal comprises solely random noise, and controls the operation of the information processing sub-system in response to the random noise assessment.

Edge effects may be minimized by including a buffer area that surrounds the primary study area, with distances only calculated for points in the primary study area, but locations in the buffer area being available as potential nearest-neighbors. With a sufficiently large buffer area, this approach can eliminate edge effects, but it is wasteful since an appropriately large buffer area may contain many locations. A second approach is to apply an edge correction to the indicator function for those points that fall near the edges of the study area.

SUMMARY OF THE INVENTION

Accordingly, it is an object of the present invention to provide a new and improved signal processing system for processing signals to determine their stochastic (random) properties. The signal processing system processes a digital signal, generated in response to an analog signal, and which includes a noise component, and possibly an information component. An information processing sub-system receives and processes the digital signal to extract any information component. A noise likelihood determination sub-system receives the digital signal and generates two random noise assessments whether the digital signal constitutes random noise, an information component, or both and controls the operation of the information processing sub-system in response to the noise assessment. The two random noise assessments include a nearest-neighbor distance assessment and a runs assessment.

To this end, there is provided a further test for application in the assessment procedures. The further test relates to a randomness assessment procedure which involves calculations reactive to a condition known to statisticians as "edge effect bias", which can introduce significant errors into calculations leading to incorrect conclusions regarding the presence of random noise and information components in a distribution.

With the above and other objects in view, there is provided a suite of randomness assessment procedures for affecting the enhancement of randomness sub-systems and increasing the probability that a correct result is obtained.

BRIEF DESCRIPTION OF THE DRAWINGS

Reference is made to the accompanying drawings in which is illustrated an embodiment of the invention, from which its novel features and advantages will be apparent, and wherein.

DETAILED DESCRIPTION OF THE INVENTION

Figure 2:
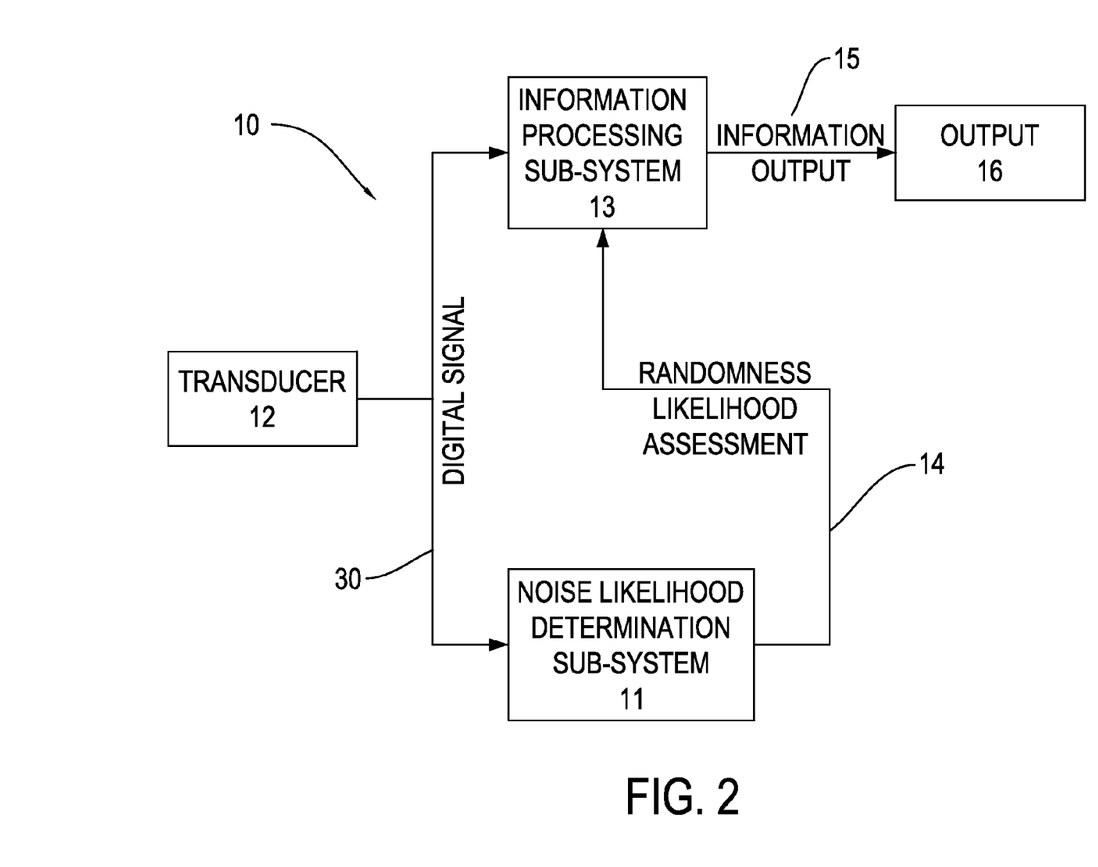
FIG. 2 is a block diagram of a signal processing system in accordance with the invention.
Figure 3A:
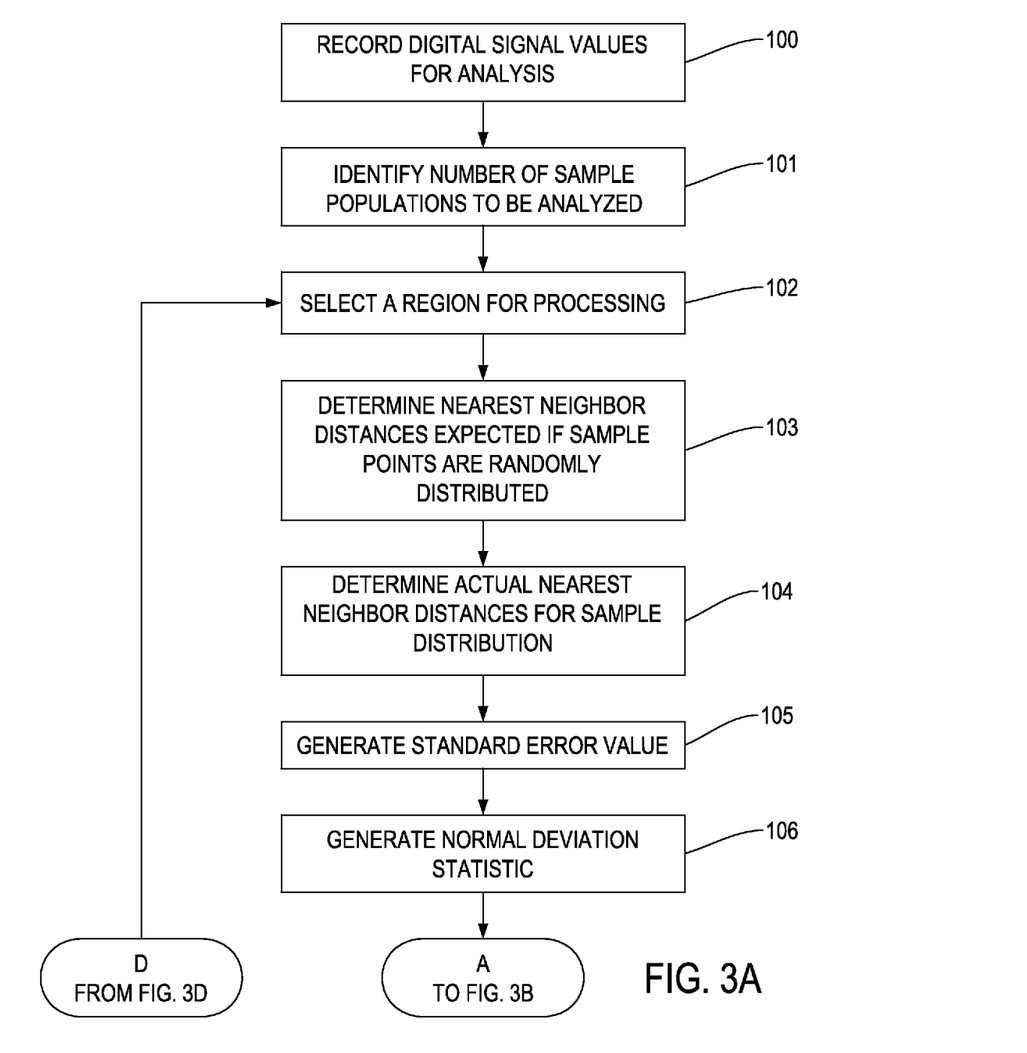
FIGS. 3A-3D together comprise a flow chart depicting operation of the detection system and method.
Figure 3B:
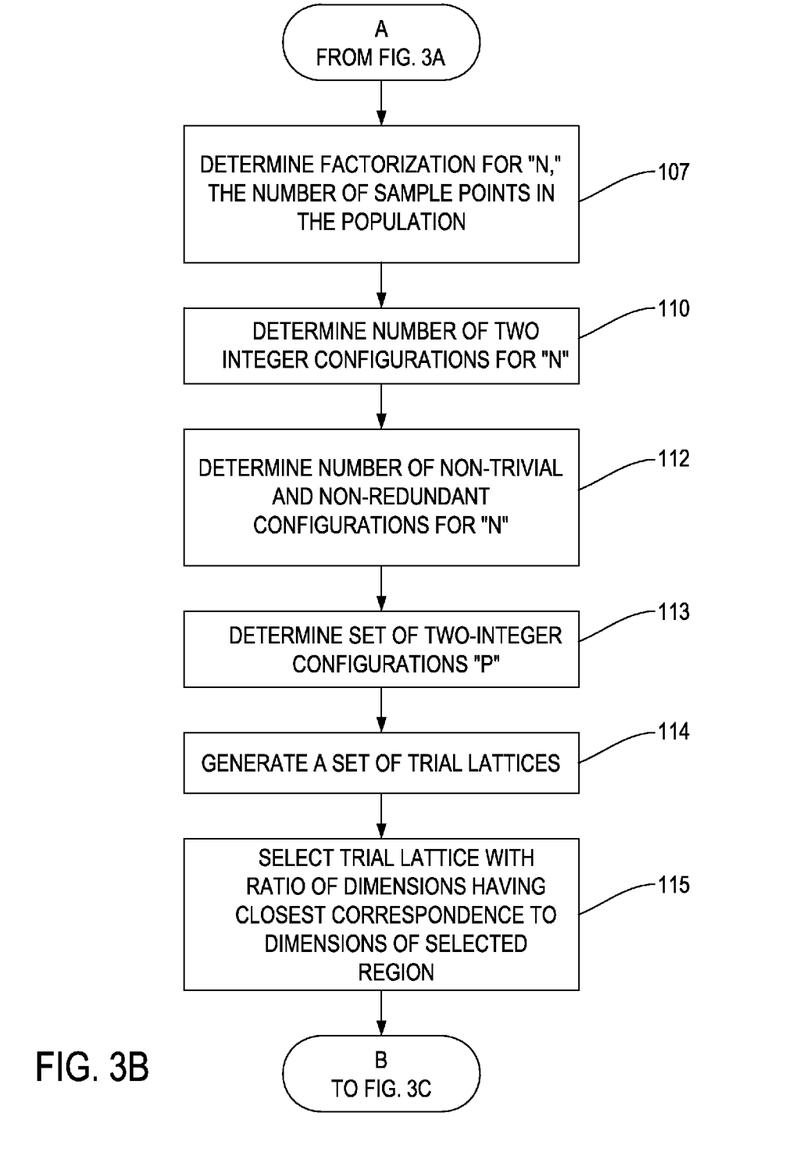
Figure 3C:
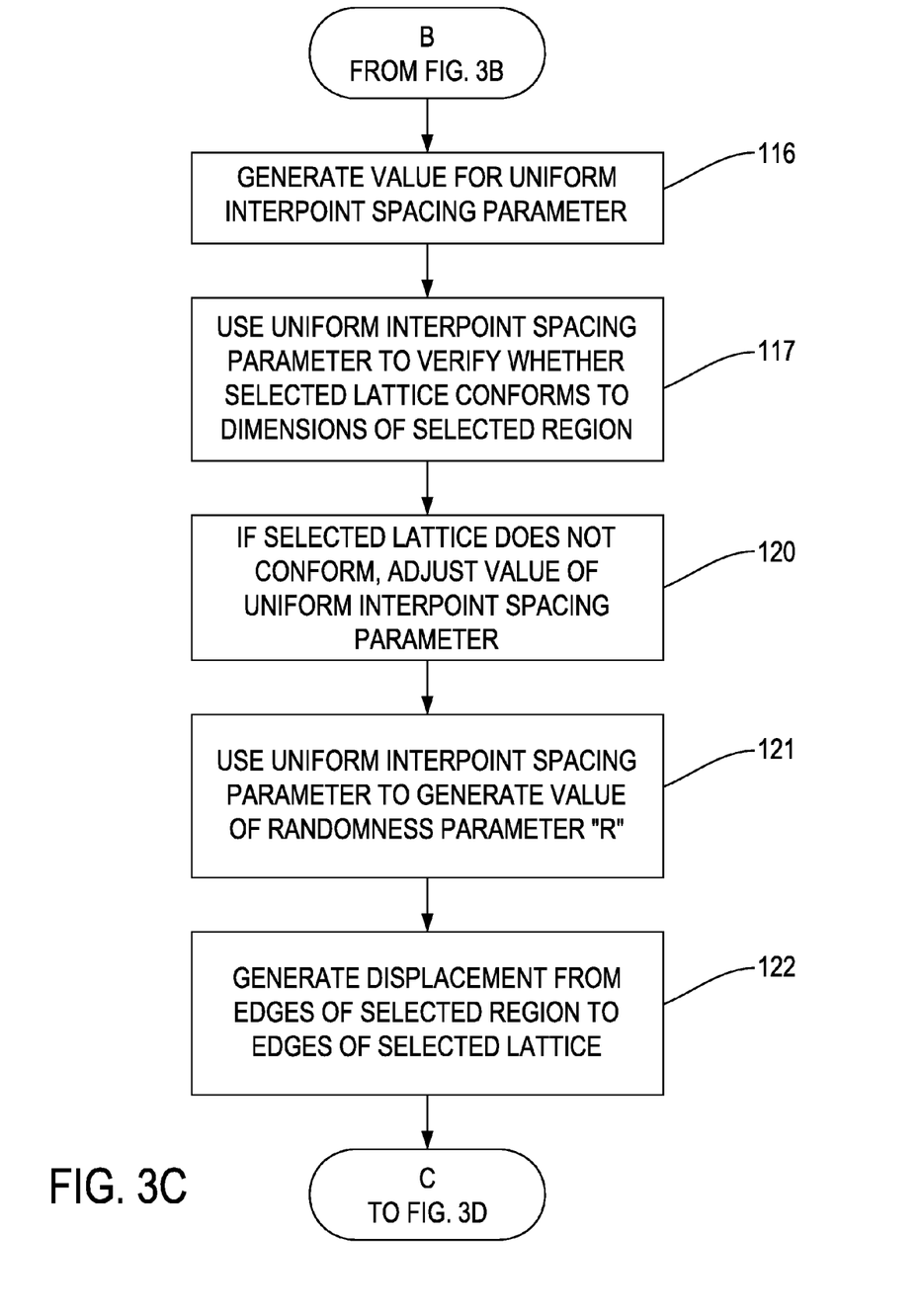
Figure 3D:
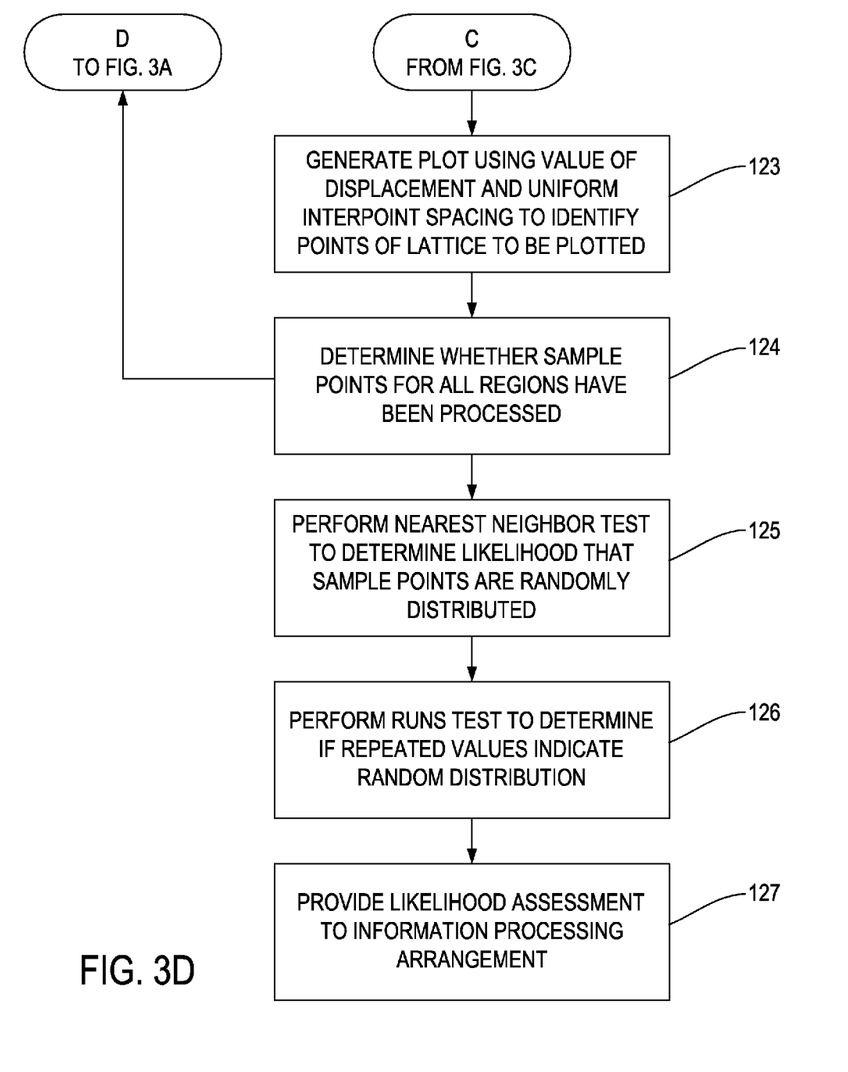

The invention provides a signal processing system 10, including a noise likelihood determination sub-system 11. FIG. 2 is a block diagram of a signal processing system 10. With reference to FIG. 2, the signal processing system 10 includes, in addition to the noise likelihood determination sub-system 11, a transducer 12, an information processing sub-system 13, and a randomness likelihood assessment output 14. The transducer 12 receives the signal, which is in acoustic, electrical, electromagnetic, or other form, and converts it to preferably digital form for processing. The digital signal may, for example, represent the amplitude of the received signal sampled at successive time intervals. The information processing sub-system 13 performs conventional signal processing operations, such as adaptive and other filtering, to attempt to extract an information component from the digital signal. In accordance with the invention, the noise likelihood determination sub-system 11 determines the likelihood that a signal is solely noise or a randomness likelihood assessment 14. When the randomness likelihood assessment exceeds a predetermined threshold, the information processing sub-system 13 determines that it will not process the digital signal inasmuch as it will not result in an output of information. If the randomness likelihood assessment is below the predetermined threshold, an information output 15 is provided to an output device 16.

Figure 4:
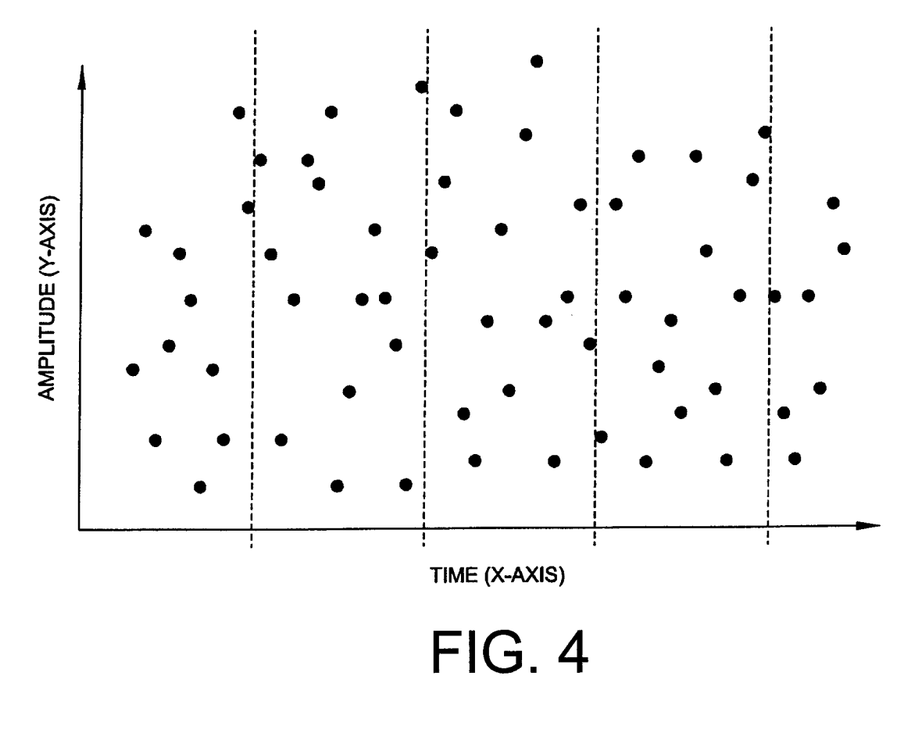
FIG. 4 is a diagrammatic illustration depicting operations performed by the system and in use of the method presented herein.

The operations performed by the noise likelihood determination sub-system 11 are described in connection with the flowchart in FIGS. 3A through 3D. Generally, the noise likelihood determination sub-system 11 performs several tests in connection with a number of populations of digital signals, each digital signal being referred to hereinafter as a "point", with each population comprising a series of digital signals generated for a series of windows representing intervals of, for example, time. The time windows used in generating the various populations may be over-lapping or non-overlapping. FIG. 4 illustrates a number of digital data points representing amplitudes of a signal taken at successive points in time. The horizontal "x" axis represents time, and the vertical "y" axis represents amplitude, and successive populations, represented by successive non-overlapped windows in time, are indicated by broken vertical lines.

With reference again to the flow chart of FIGS. 3A, 3B, 3C, 3D, the noise likelihood determination sub-system 11 initially records the digital values represented by the various sample points, such as shown in FIG. 4, for an analysis (step 100, FIG. 3A) and identifies the number of populations of sample points to be analyzed (step 101).

The noise likelihood determination sub-system 11 then proceeds to a series of iterations, in each iteration selecting one sample point population and generating several metrics useful in determining the likelihood that the sample points in the population are randomly distributed in the region containing the sample, that is, in the portion of the Cartesian (that is, the x-y plane) containing the set of sample points in the population. It will be appreciated that the region containing each sample is bounded along the time axis (the horizontal, or "x" axis shown in FIG. 4) by the beginning and end points of the time window for the region, and along the amplitude axis (the vertical, or "y" axis shown in FIG. 4) by arbitrary minimum and maximum amplitude values. A specific region for analysis is selected in step 102.

In each interaction, after selecting the sample point population to be analyzed during an iteration, the noise likelihood determination sub-system 11 determines the average distance between nearest-neighbor sample points which would be expected if the sample points were randomly-distributed in the region of interest (step 103) and the expected distance between nearest-neighbor sample points (step 104).

One potential source of bias in using $\mu_r$ and $\sigma_r$ (as previously disclosed) in non-Monte Carlo studies is the phenomenon known as the "edge effect", exemplified in FIG. 1. Edge effects arise because the distribution of the distances assumes an unbounded area, but the observed (nn) (nearest-neighbor) distances are calculated from points in a defined study area. When a point is near the edge or border of the outer boundary of the study area, it is possible that the true nearest-neighbor is a point just outside the study area, not a more distant point that happens to be in the study area. Edge effects lead to overestimation (positive bias) of the mean distance. Edge effects can be practically important. Neglecting them can alter conclusions about the spatial pattern and random/not random decision. Edge effects can seriously degrade distance-based statistics. Besides the positive bias of $\mu_r$ mentioned above, edge effects also degrade the assumptions of Gaussianity (normal distribution properties), upon which Z statistics (infra) are used.

There are at least two ways to deal with these. Edge effects may be minimized by including a buffer area that surrounds the primary study area and distances are only calculated for points in the primary study area, but locations in the buffer area are available as potential nearest-neighbors. With a sufficient large buffer area, this approach can eliminate edge effects, but it is wasteful since an appropriately large buffer area may contain many locations. A second approach is to apply an edge correction to the indicator function for those points that fall near the edge of the study area. The second approach is the method used in this enhancement process. Thus, Equation (1) and Equation (4) represent enhancements to the prior art.

The noise likelihood determination sub-system 11 in step 103 generates the expected distances between nearest-neighbor sample points as follows:

$$\mu_r = \frac{1}{2}(AN^{-1})^{1/2} + 0.0514PN^{-1} + 0.4100PN^{-3/2} \quad (1)$$

where N=sample size; A=area; P=perimeter of the rectangular region.

The noise likelihood determination sub-system 11 in step 104 generates the actual distances between nearest-neighbor sample points as follows. Initially, the noise likelihood determination sub-system 11 establishes a distance matrix D, including a number of rows and columns, each associated with one of the ample points.

The noise likelihood determination sub-system 11 then determines a distance d(i, j) representing the distance between each pair of sample points (i, j). If the sample points are considered as points on a two-dimensional Cartesian plane (that is, a conventional x, y plane, with the values of the coordinates given for each point) such as shown in FIG. 4, the distance value d(a, b) representing the distance between any two sample points "a" and "b" is $$d(a,b) = \sqrt{(x_a - x_b)^2 + (y_a - y_b)^2} \quad (2)$$

where $(x_a, y_a)$ are the Cartesian coordinate values of sample point "a", and $(x_b, y_b)$ are the Cartesian values of sample point "b". Extensions to higher dimensions and other coordinate systems will be readily apparent to those skilled in the art. The noise likelihood determination sub-system 11 inserts each distance value d(a, b) so generated in the appropriate location of the distance matrix D, in particular at row "a" and column "b" for each pair of sample points. Ignoring the values along the diagonal d(a, a) of the distance matrix D (which, if generated by the noise likelihood determination sub-system 11 represent the distance between each point and itself), for each row "I", the matrix element d(I,j) ("j" being an index from "1" to the number "N" of sample points in the region), identifying the number having the lowest value which is the minimum distance between the sample point associated with the row I and any other sample point in the region. Similarly, for each column "J", the matrix element d(i, J) ("i" also being an index form "1" to the number of sample points in the region), identifying the number having the lowest value which is the minimum distance between the sample point associated with the column J and any other sample point in the region. Representing the minimum value in each row "I" as "min $(d_{i,j})$", the actual average distance between nearest-neighbor sample points is $$\bar{r} = \frac{1}{N}[\min(d_{i,j}) + \min(d_{2,j}) + \ldots + \min(d_{N,j})]. \quad (3)$$

In step 105, the noise likelihood determination sub-system 11 generates a new unbiased standard error value $\sigma_r$ of the nearest neighbor mean distance in a random population density $\rho$ as:

$$\sigma_r = \sqrt{0.0703AN^{-2} + 0.0307A^{1/2}N^{-5/2}}. \quad (4)$$

The noise likelihood determination sub-system 11 uses the values for $\mu_r$ (the average distance between nearest-neighbor sample points that would be expected if the distribution were randomly distributed), $\bar{r}$ (the actual average distance between nearest neighbor sample points), and the error value $\sigma_r$ to generate a normal deviation statistic $$Z = \frac{\bar{r} - \mu_r}{\sigma_r} \quad (5)$$

(step 106) as a nearest-neighbor distance deviation assessment value to be used in performing a significance test, as described below in connection with step 125.

Following step 106, the noise likelihood determination sub-system 11 performs a series of operations to generate a second randomness identifier R, which is used in determining the likelihood that the digital signal represents a random distribution. Initially, the noise likelihood determination of sub-system 11 generates an interpoint spacing parameter value δ as follows. If it is assumed that "N" sample points are in a region A=X×Y, in particular a two dimensional region having a length "X" and a width "Y", wherein the length X and width Y may correspond to the distances of the region along the x-axis and the y-axis, respectively, or may correspond to the distances along the y-axis and the x-axis, respectively. Thus, "X" represents the length, or the larger dimension, of the region, and "Y" represents the width, or the smaller dimension, of the region.

In step 107, the noise likelihood determination sub-system 11 performs a series of steps to generate a two-dimensional lattice L, having dimensions "R" and "C", which is the smallest lattice which covers all of the sample points in the region. It will be appreciated that if the value of N is not a prime number (if N is originally a prime number, it can be augmented by adding at least one sample point in the population), the value of N can be expressed in terms of prime factors $P_j$ as $$N = \prod_{j=1}^{r} P_j^{a_j} \quad (6)$$

(step 107). The noise likelihood determination sub-system 11 then generates a value corresponding to the number of "configurations" of N, that is, the number of two-integer factorizations of "N" (step 110). The number of factorizations corresponds to the dimensionality of the region; in this case, the region is two dimensions. The number configurations of N is given by $$\tau(N) = \prod_{j=1}^{r} (a_j + 1) \quad (7)$$

where the values of $a_j$ in equation (7) correspond to the values of the exponents in equation (6).

The noise likelihood determination sub-system 11 then uses τ(N), the number of configurations of N, to determine the number of non-trivial or non-redundant configurations (step 112), that is, the number of configurations other than the ones for which N=N×1 or N=1×N (the trivial configurations), or N=R×C and N=C×R (the redundant configurations). It is clear that the number of non-trivial and non-redundant configurations corresponds to $$\phi(RC) = \frac{\tau(N) - 2 + s}{2} \quad (8)$$

where "s" has the value "one" if N is a square number (that is, N=n², where "n" is an integer), or "zero" otherwise. The noise likelihood determination sub-system 11 generates the set P of all two-element configurations as P={$R_1C_1$, $R_2 C_2$, ..., $R_m C_m$}, where "m" is the number of non-trivial and non-redundant configurations as determined in equation (9), hereinbelow.

The noise likelihood determination sub-system 11 uses the set of configurations P generated in Step 113 to generate a set of trial lattices (step 114), from which one will be selected as an optimal lattice. In particular, the noise likelihood determination sub-system 11 first identifies the configuration $R_j$, $C_j$ for which $R_j/C_j$ is closest to X/Y (that is, the configuration for which X/Y−$R_j/C_j$ is a minimum), where the value of X is greater than the value of Y, and the value of $R_j$ is greater than the value of $C_j$ (step 115). The noise likelihood determination sub-system 11 then generates the uniform interpoint spacing parameter δ as:

$$\delta = \sqrt{\frac{A}{N}} = \sqrt{\frac{XY}{R_j C_j}} \quad (9)$$

where "A" represents the area of a region (step 116). The noise likelihood determination sub-system 11 checks for conformity of the dimensions of the selected lattice (that is, the lattice defined by $R_j$ and $C_j$) to the dimensions of the region (step 117) and, if they do not conform, adjusts the value of the uniform interpoint distance parameter δ to force conformance (step 120). In particular, if the value of $(R_j−1)δ$ is greater than, or equal to, the value of X, or if the value of $(C_j−1)δ$ is greater than, or equal to, the value of Y, the noise likelihood determination sub-system 11 generates the value of the uniform interpoint distance parameter δ as:

$$\delta = \min\left[\frac{X}{R_j - 1} - \frac{Y}{C_j - 1}\right] - 0.1 \quad (10)$$

where "min" refers to the "minimum" operator, and the factor 0.1 can be adjusted up or down, as needed to force conformance.

If the system 10 determines in step 116 that multiple configurations $R_j C_j$ provide the same minimum value for X/Y—$R_j/C_j$, the system generates a value for the uniform interpoint distance parameter $δ_j$ for each such configuration, as described above, with equations (9) and (10), and selects the configuration which provides the maximum value for $δ_k$. If multiple configurations provide the same maximum value for $δ_k$ the system generates a value for $\bar{\Delta}$, a metric defining average unit lattice distance defined as $$\bar{\Delta} = \frac{12\sum_{i=1}^{R-1}\sum_{j=1}^{C-1}(R-i)(C-j)\sqrt{i^2+j^2} + RC(R^2 + C^2 - 2)}{3(RC)(RC-1)} \quad (11)$$

and selects the lattice configuration which provides the smallest value of $\bar{\Delta}$.

After generating a value for the interpoint spacing parameter δ, the system generates the value "R" as $$R = 2δ\sqrt{ρ} \quad (12)$$

(step 121) where, as above, "ρ" corresponds to the spatial density of sample points in the region, that is, ρ corresponds to "N/A", where "N" is the number of sample points and "A" represents the area of the region. The value of "R" generated in equation (12) provides an indication of the degree of randomness of the points in the sample population. In particular, the value of "R" generated in equation (12) ranges from "zero" to "two", with a value of zero indicating that all of the points in the region lie on the same point, and a value of "two" indicating that all of the points in the region are uniformly distributed. If the value of "R" is on the order of "one", the points are generally randomly distributed in the region.

In step 122, the noise likelihood determination sub-system 11 performs a series of steps to generate a third statistic used in assessing randomness, in particular, a plot representing the maximum dispersion of N test points arranged in "r" rows and "c" columns in the region A having a length "X" and a width "Y", using the uniform interpoint spacing δ determined above. Initially, the noise likelihood determination sub-system 11 performs a step 122 in which the sub-system 11 uses the uniform interpoint spacing parameter δ, and the number of lattice points "R" and "C" along each dimension of the lattice L to determine values of "p" and "q", which represent the displacement from the edges of the region A and the lattice L. In that operation, since the values of the length "X" and width "Y" for the region A are known, $$X = (R-1)\delta + p \quad (13)$$

and $$Y = (C-1)\delta + q \quad (14)$$

where "p" and "q" represent the respective differences between the length and width of the region A, with length X and width Y, and the length and width of the "R×C" lattice applied thereto. Accordingly, if it is assumed that the length X of the region A is along the "x-axis" and the width Y is along the "y-axis", the noise likelihood determination sub-system 11 generates the plot (step 123) using as points of the lattice defined by $(x_k, y_j)$ wherein $$x_k = \frac{p}{2} + (k-1)\delta \quad (15)$$

and $$y_j = \frac{q}{2} + (j-1)\delta \quad (16)$$

wherein "k" in equation (15) extends from zero to R−1 and "j" in Equation (16) extends from zero to C−1.

The noise likelihood determination sub-system 11 generates the values for Z (Equation (5)), R (Equation (12)), and the maximum dispersion plot (step 123) for each of the plurality of populations. Accordingly, after the sub-system finishes step 123 for one population, it returns to step 103 to perform an operation for the next population (step 124). After performing the operations to generate values for Z, R, and the uniform dispersion plot for all of the populations, the system sequences to a step 125 to perform a nearest neighbor average distance test. In that operation, in connection with the value for Z, the noise likelihood determination sub-system 11 uses as the null hypothesis $$H_o: \bar{r} = \mu \quad (17)$$

as indicating that the points are randomly distributed, and as the alternative hypothesis $$H_i: \bar{r} \neq \mu \quad (18)$$

as indicating that the points are not randomly distributed. It will be appreciated that if the points are randomly distributed, the values for r̄, the average actual distance between points in the population, would be distributed around $\mu_r$, the average distance between points that would be expected if the points were randomly distributed, in a Gaussian distribution with a mean, or average, $\mu_r$. The standard significance test, using values for r̄, $\mu_r$ and the normal deviate value Z, indicates the likelihood that the null hypothesis is correct. The noise likelihood determination sub-system 11 may perform similar operations in connection with the values R, and the uniform dispersion plots generated for all of the populations, and determine an assessment as to the likelihood that the signal as received by the transducer was random, and provide that assessment to the information processing sub-system 13. The information processing sub-system 13 uses the randomness assessment in determining the utility of further analyzing the signal to attempt to extract information.

Truly, nonrandom distributions are occasionally incorrectly labeled. For this reason, there is provided herein an additional randomness assessment procedure at step 126 for a single point pattern, effecting an enhancement of the randomness likelihood subsystem, leading to a correct decision. This assessment is the "nonparametric One Sample Median Runs Test" (MRT), uniquely designed to test for the presence of spatial randomness specifically, and well known to those skilled in the art. This test is fully described in U.S. Pat. No. 6,397,234 incorporated herein by reference. In the MRT, the procedural steps are as follows: First, the arithmetic median value of the distribution Y, called Median (Y), is calculated. Next, each value of the original distribution is compared against Median (Y). If the value of the original distribution Y is greater than Median (Y), measurement y is re-labeled y=1. If the value of the original distribution Y is less than or equal to Median (Y), measurement y is re-labeled y=0. Starting at the first value of the transformed y-measurements in the time series, and continuing in this sequential fashion, the number of "runs" in the ordered 0/1 binary distribution is counted. A "run" (also known as a "clump") is a countable sequence of at least one consecutive identical outcome. For the present invention, a "run" is a sequential homogeneous stream of zero or one data, followed by a different sequential homogeneous stream of 0 or 1 data. Arbitrarily, label the total number of ones by $n_1$ and the total number of zeros by $n_2$. For example, in the data sequence "0001100000111100000111": $n_1$=9, ones and $n_2$=13, zeros; the total sample size is N=$n_1$+$n_2$ or 22. There are six runs, the first run being "000", the second run "11", the third run "00000", the fourth run "1111", the fifth run "00000" and the sixth run being "111". Thus the data sequence has r=6 runs, which may be tested for randomness. A sample of ordering binary data (1/0), corresponding to the ups and downs of the behavior of the Y amplitude of the time series, may show too few or too many runs to be attributed to mere chance variation, indicating signal information which may be extracted in detecting or tracking objects in an ocean environment. Or the number of runs might be in accord with the laws of probability, indicating a mere chance fluctuation in the behavior of the time series distribution, indicative of noise.

In a distribution that is truly a random one, an expected or average number of total runs E(r) is given by the relation:

$$E(r) = \frac{2n_1 n_2}{n_1 + n_2} + 1 \quad (19)$$

The variance of spread in the number of runs is equal to:

$$\sigma_r^2 = \frac{2n_1 n_2 (2n_1 n_2 - n_1 - n_2)}{(n_1 + n_2)^2 (n_1 + n_2 - 1)} \quad (20)$$

For large samples, to assess statistically the relationship of the total sample number of runs r in two dimensions to the distributional moments, E(r), $\sigma_r^2$, the sample statistic r and the population parameters are provided in a Gaussian test statistic, Z, in the following manner:

$$Z = \frac{r - E(r)}{\sqrt{\sigma_r^2}} \quad (21)$$

If the sample is small ($n_1$, $n_2$<10), the r value is saved in memory. The p value is calculated, either for the Z statistic, or for small samples, in the standard manner, as follows.

The cumulative probability for computing sample runs r is determined by computing the probability of obtaining a quantity "the likelihood of obtaining that many runs", $P(r \leq R)$ in a random sample. To obtain the 2-sided equivalent using normal distribution approximation, the above probability is doubled to obtain the quantity, $$p = P(r \leq R) + P(r \geq R) = 2f(r). \quad (22)$$

The probability, conditional upon r being an even or odd number, is provided by sums of the following combinational ratios:

When r is even:

$$P(r \leq R) = f(r) = 2 \frac{\begin{bmatrix} n_1 - 1 \\ k - 1 \end{bmatrix} \begin{bmatrix} n_2 - 1 \\ k - 1 \end{bmatrix}}{\begin{bmatrix} n_1 + n_2 \\ n_1 \end{bmatrix}} \quad (23)$$

where k is found from $$r = 2k \Rightarrow k = \frac{r}{2} > 1,$$

and (r) is the combinatorial relation. Total probability for 2-sided alternative is: $p = P(r \leq R) + P(r \geq R) = 2f(r)$.

When r is odd:

$$P(r \leq R) = f(r) = \frac{\begin{bmatrix} n_1 - 1 \\ k \end{bmatrix} \begin{bmatrix} n_2 - 1 \\ k - 1 \end{bmatrix} + \begin{bmatrix} n_1 - 1 \\ k - 1 \end{bmatrix} \begin{bmatrix} n_2 - 1 \\ k \end{bmatrix}}{\begin{bmatrix} n_1 + n_2 \\ n_1 \end{bmatrix}}, \quad (24)$$

where k is found from $$r = 2k + 1 \Rightarrow k = \frac{r - 1}{2} > 1.$$

Total Probability for 2-sided alternative is: $p = P(r \leq R) + P(r \geq R) = 2f(r)$.

A hypothesis test having two components is then formulated $$H_o: r = E(r) \text{ (NOISE ONLY)} \quad (25)$$

$$H_1: r \neq E(r) \text{ (SIGNAL+NOISE)} \quad (26)$$

The distribution is labeled NOISE if $p \leq a$, where a is the false alarm rate; otherwise the presence of the signal is most likely. If r is significantly lower than the expected value, $E(r)$, this implies a grouping or clustering of measurements. If r is significantly higher than the expected value, $E(r)$, this implies a repeated, alternating pattern in the measurements.

In step 127, the information processing sub-system 13 receives the nearest neighbor randomness assessment and the runs test randomness assessment. In one embodiment, the information processing subsystem 13 continues processing digital signal 30 when both assessments indicate that digital signal 30 contains an informational component. In another embodiment, the information processing sub-system 13 continues processing digital signal 30 if either the nearest neighbor randomness assessment from step 125 or the runs test randomness assessment from step 126 indicate an informational component in the signal. Selection of these embodiments depends on the application's tolerance for processing a signal without an informational component.

Although the noise likelihood determination sub-system 11 has been described in connection with assessing randomness in a signal, such as an acoustic, electrical or electromagnetic signal, it will be appreciated that the sub-system 11 finds utility in other areas in which it is desirable to assess randomness.

It will be understood that many additional changes in the details, steps, and arrangement of steps, which have been herein described and illustrated in order to explain the nature of the invention, may be made by those skilled in the art, within the principles and scope of the invention as expressed in the appended claims.

The foregoing description of the preferred embodiment of the invention has been presented for purposes of illustration and description only. It is not intended to be exhaustive nor to limit the invention to the precise form disclosed; and obviously, any modifications and variations are possible in light of the above teaching. Such modification and variations that may be apparent to a person skilled in the art are intended to be included within the scope of this invention or defined by the accompanying claims.

What is claimed is:

1. A signal processing system comprising:
   transducer means for receiving an analog signal, the analog signal including a noise component and possibly also an information component, and generating in response a digital signal which is represented by a plurality of sample points distributed over a selected region;
   a nearest-neighbor distance calculation component joined to receive the digital signal and capable of calculating an actual average nearest neighbor distance between said plurality of sample points without edge effects, said nearest-neighbor distance calculation component being capable of calculating an expected average nearest neighbor distance between said plurality of sample points without edge effects;
   a standard error value calculation component joined to receive the digital signal and capable of calculating a standard error value without edge effects for the expected average nearest neighbor distance;
   a nearest-neighbor test component joined to receive the actual average nearest neighbor distance, the expected average nearest neighbor distance and the standard error value, said nearest-neighbor test component capable of generating a first random noise assessment that the digital signal comprises solely random noise when a comparison of the actual average nearest neighbor distance against the expected average nearest neighbor distance and the standard error value indicates that the actual average nearest neighbor distance is within the standard error value of the expected average nearest neighbor distance;

a runs test component joined to receive the digital signal and capable of generating a second randomness assessment based on a comparison of actual repeated values in said digital signal against expected values in said digital signal, a similarity in actual repeated values to expected values providing a second random noise assessment that the digital signal comprises solely random noise; and an information processing sub-system joined to receive the digital signal, the first random noise assessment and the second random noise assessment, said information processing subsystem processing the data signal to extract said information component if at least one of the first random noise assessment and the second random noise assessment indicates that the digital signal does not comprise solely random noise.

2. The apparatus of claim 1 wherein said information processing sub-system processes the data signal to extract said information component if the first random noise assessment and the second random noise assessment both indicate that the digital signal does not comprise solely random noise.

3. A signal processing method comprising the steps of:
receiving an analog signal, the analog signal including a noise component and possibly also an information component;
generating a digital signal from the analog signal which is represented by a plurality of sample points distributed over a selected region;
calculating an actual nearest neighbor distance between said plurality of sample points without edge effects from the digital signal;
calculating an actual average nearest neighbor distance between said plurality of sample points without edge effects from the digital signal;
calculating an expected average nearest neighbor distance between said plurality of sample points without edge effects from the digital signal;
calculating a standard error value from the digital signal without edge effects for the expected average nearest neighbor distance;
generating a first random noise assessment that the digital signal comprises solely random noise when a comparison of the actual average nearest neighbor distance against the expected average nearest neighbor distance and the standard error value indicates that the actual average nearest neighbor distance is within the standard error value of the expected average nearest neighbor distance;
determining actual repeated values in said digital signal;
calculating expected repeated values in said digital signal;
generating a second randomness assessment based on a comparison of the actual repeated values against the expected values in said digital signal, a similarity in actual repeated values to expected values providing a second random noise assessment that the digital signal comprises solely random noise; and
receiving the digital signal, the first random noise assessment and the second random noise assessment;
processing the data signal to extract the information component if at least one of the first random noise assessment and the second random noise assessment indicates that the digital signal does not comprise solely random noise.

4. The apparatus of claim 3 wherein said step of processing the data signal is performed if both the first random noise assessment and the second random noise assessment indicate that the digital signal does not comprise solely random noise.

5. A signal processing system comprising:
transducer means for receiving an analog signal, the analog signal including a noise component and possibly also an information component, and generating in response a digital signal which is represented by a plurality of sample points distributed over a selected region that is rectangular in shape;
a nearest-neighbor distance calculation component joined to receive the digital signal and capable of calculating an actual average nearest neighbor distance between said plurality of sample points without edge effects, said nearest-neighbor distance calculation component being capable of calculating an expected average nearest neighbor distance between said plurality of sample points without edge effects wherein:
said nearest-neighbor distance calculation component calculates the expected average nearest neighbor distance, $\mu_r$, in accordance with:

$$\mu_r = \frac{1}{2}(AN^{-1})^{1/2} + 0.0514 PN^{-1} + 0.4100 PN^{-3/2}$$

where N is the number of sample points, A is an area of the selected region, and P is a perimeter of the selected region; and
said nearest-neighbor distance calculation component calculates actual average nearest neighbor distance in accordance with:

$$\bar{r} = \frac{1}{N}[\min(d_{1,j}) + \min(d_{2,j}) + \ldots + \min(d_{N,j})]$$

where $d_{i,j}$ is a distance between two sample points; and
a standard error value calculation component joined to receive the digital signal and capable of calculating a standard error value without edge effects for the expected average nearest neighbor distance wherein said standard error test component generates the standard error value, $\sigma_r$, in accordance with:

$$\sigma_r = \sqrt{0.0703 AN^{-2} + 0.0307 A^{1/2} N^{-5/2}};$$

a nearest-neighbor test component joined to receive the actual average nearest neighbor distance, the expected average nearest neighbor distance and the standard error value, said nearest-neighbor test component capable of generating a first random noise assessment that the digital signal comprises solely random noise when a comparison of the actual average nearest neighbor distance against the expected average nearest neighbor distance and the standard error value indicates that the actual average nearest neighbor distance is within the standard error value of the expected average nearest neighbor distance;
a runs test component joined to receive the digital signal and capable of generating a second randomness assessment based on a comparison of actual repeated values in said digital signal against expected values in said digital signal, a similarity in actual repeated values to expected values providing a second random noise assessment that the digital signal comprises solely random noise; and
an information processing sub-system joined to receive the digital signal, the first random noise assessment and the second random noise assessment, said information processing subsystem processing the data signal to extract said information component if at least one of the first random noise assessment and the second random noise assessment indicates that the digital signal does not comprise solely random noise.

6. A signal processing method comprising the steps of:

receiving an analog signal, the analog signal including a noise component and possibly also an information component;

generating a digital signal from the analog signal which is represented by a plurality of sample points distributed over a selected region wherein said selected region is rectangular in shape;

calculating an actual nearest neighbor distance between said plurality of sample points without edge effects from the digital signal;

calculating an actual average nearest neighbor distance in accordance with:

$$\bar{r} = \frac{1}{N}[\min(d_{i,j}) + \min(d_{2,j}) + \ldots + \min(d_{N,j})]$$

where $d_{i,j}$ is a distance between two sample points;

calculating an expected average nearest neighbor distance between said plurality of sample points without edge effects from the digital signal, said step of calculating the expected average nearest neighbor distance, $\mu_r$, being in accordance with:

$$\mu_r = \frac{1}{2}(AN^{-1})^{1/2} + 0.0514PN^{-1} + 0.4100PN^{-3/2}$$

where N is the number of sample points, A is an area of the selected region, and P is a perimeter of the selected region;

calculating a standard error value from the digital signal without edge effects for the expected average nearest neighbor distance, the standard error value, $\sigma_r$, being calculated in accordance with:

$$\sigma_r = \sqrt{0.0703AN^{-2} + 0.0307A^{1/2}N^{-5/2}}$$

generating a first random noise assessment that the digital signal comprises solely random noise when a comparison of the actual average nearest neighbor distance against the expected average nearest neighbor distance and the standard error value indicates that the actual average nearest neighbor distance is within the standard error value of the expected average nearest neighbor distance;

determining actual repeated values in said digital signal;

calculating expected repeated values in said digital signal;

generating a second randomness assessment based on a comparison of the actual repeated values against the expected values in said digital signal, a similarity in actual repeated values to expected values providing a second random noise assessment that the digital signal comprises solely random noise;

receiving the digital signal, the first random noise assessment and the second random noise assessment; and processing the data signal to extract the information component if at least one of the first random noise assessment and the second random noise assessment indicates that the digital signal does not comprise solely random noise.

* * * * *